Oct. 23, 1923.  
W. L. TEDFORD  
CHAFING PLATE  
Filed Feb. 17, 1923  
1,471,425

Inventor.  
WILLIAM L. TEDFORD.  
By F. R. Cornwall Atty.

Patented Oct. 23, 1923.

1,471,425

UNITED STATES PATENT OFFICE.

WILLIAM LAWRENCE TEDFORD, OF PARIS, FRANCE.

CHAFING PLATE.

Application filed February 17, 1923. Serial No. 619,656.

*To all whom it may concern:*

Be it known that I, WILLIAM L. TEDFORD, a citizen of the United States, residing at Paris, France, have invented a certain new and useful Improvement in Chafing Plates, of which the following is a full, clear, and exact description, such as will enable others skilled in the art to which it appertains to make and use the same, reference being had to the accompanying drawings, forming part of this application.

This invention relates to a new and useful improvement in chafing plates for truck bolsters, the object being to provide a bolster with a renewable chafing plate, which plate is so held in position that it is secured against movement in all directions except upwardly by being interlocked with the bolster, the upward movement of the chafing plate being restrained by a bolt or other removable fastening device for facilitating removability and renewability, when desired.

In the drawings—

Figure 1:
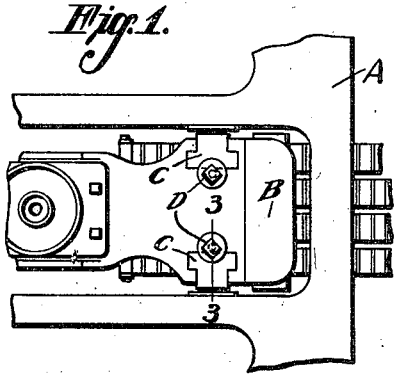
Figure 1 is a partial plan view of a part of a car truck frame and one end of a car truck bolster provided with my improved chafing plate.
Figure 2:
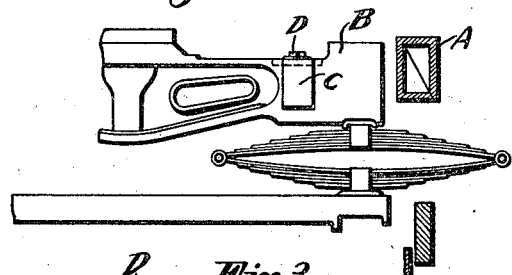
Figure 2 is a side elevational view, partly in section, of the parts shown in Figure 1.
Figure 3:
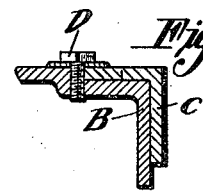
Figure 3 is a sectional view on line 3—3 of Figure 1.

In the drawings, A indicates a part of the car truck frame, B indicates one end of a car truck bolster, and C indicates a chafing plate shown in Figures 1, 2 and 3 as being made of pressed material, the upper portion of said chafing plate being T-shaped and placed in a recess in the top face of the bolster, thereby becoming interlocked with the bolster. D indicates a bolt threaded into the bolster and extending over the edge of the chafing plate to lock it against upward movement. This bolt can be removed and the chafing plate raised out of interlocking engagement for purposes of renewal when the old chafing plate is worn.

Figure 4:
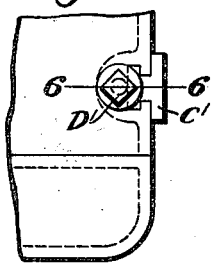
Figure 4 is a top plan view of a modified form of chafing plate.
Figure 5:
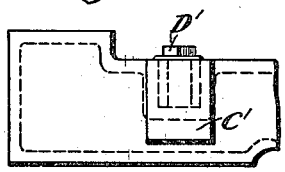
Figure 5 is a side elevational view of the form shown in Figure 4.
Figure 6:
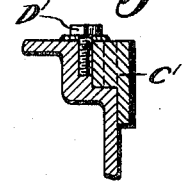
Figure 6 is a sectional view on the line 6—6 of Figure 4.
Figure 7:
Figure 7 is a top plan view of another form of chafing plate.
Figure 8:
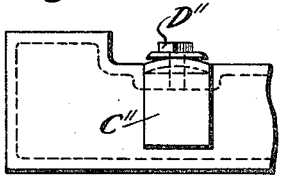
Figure 8 is a side elevational view of the form of chafing plate shown in Figure 7.
Figure 9:
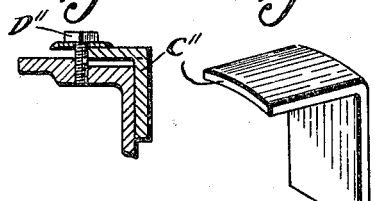
Figure 9 is a sectional view on line 9—9 of Figure 7.

In Figures 4, 5 and 6, I have shown a chafing plate C' made of cast metal in which there is a T-shaped rib at the back of the plate dovetailed into a correspondingly shaped groove in the side wall of the bolster.

This form of chafing plate is held in position by bolt D' heretofore described.

Figure 10:
Figure 10 is a detail view of the chafing plate shown in Figures 7, 8 and 9.

In Figures 7 to 10, inclusive, the chafing plate C" is made of pressed steel, its horizontal leg being curved, as shown in Figure 10, and of slightly greater width than the recess in the top face of the bolster. When this form of chafing plate is placed in position and bolt D" is threaded home and tightened against the bowed portion, the horizontally curved portion of the chafing plate will be flattened and expanded in width and thus be securely locked between the edges of the recesses in the top of the bolster. Thus, the chafing plate is held against displacement by friction. The walls of the recesses which receive the curved horizontal portion of the chafing plate may be slightly undercut, if desired.

Figure 11:
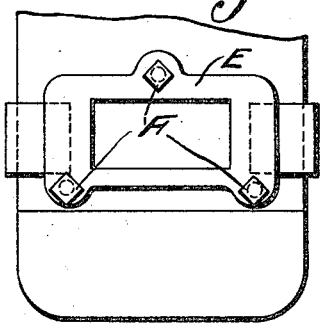
Figure 11 is a top plan view of a modified form of fastening means for the chafing plates.

In Figure 11, I have shown a side bearing casting E having bottom flanges which are bolted to the top of the bolster by bolts F. This casting extends laterally over the horizontal portions of the chafing plates on each side of the bolster, and hence the side bearing constitutes a fastening means for the renewable chafing plates which are seated in suitable recesses in the top of the bolster to prevent movement other than vertical.

Figure 12:
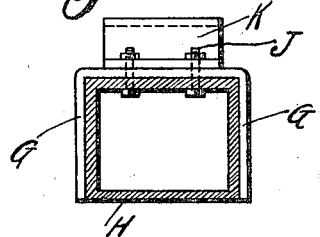
Figure 12 is a section through a bolster illustrating another modification of my invention.

Figure 12 illustrates chafing plates G for the opposite sides of the bolster H formed in a single piece, of inverted U-shape, straddling the bolster, and held in place either by vertical bolts J or by the side bearing K which in turn is bolted to the bolster. In this form no recesses in the bolster are necessary.

What I claim is:

1. A renewable chafing plate for car truck bolsters having means for interlocking engagement with the bolster to prevent movement in all directions excepting one, and removable fastening means for locking the chafing plate in position.

2. In a truck, a bolster, a chafing plate for engagement with the top and side of the bolster and removable vertically upwardly from the bolster, and detachable means for securing said plate against such movement.

3. In combination, a truck bolster having a recess in its upper face and a bolster chafing plate fitting in said recess and extending along a portion of the side of said bolster, and removable means for retaining said plate against movement from said recess.

In testimony whereof I hereunto affix my signature this 14th day of February, 1923.

WILLIAM LAWRENCE TEDFORD.